Jan. 25, 1927. 1,615,337
S. J. MORRISON
AIR WASHER ATTACHMENT
Filed Sept. 18, 1925
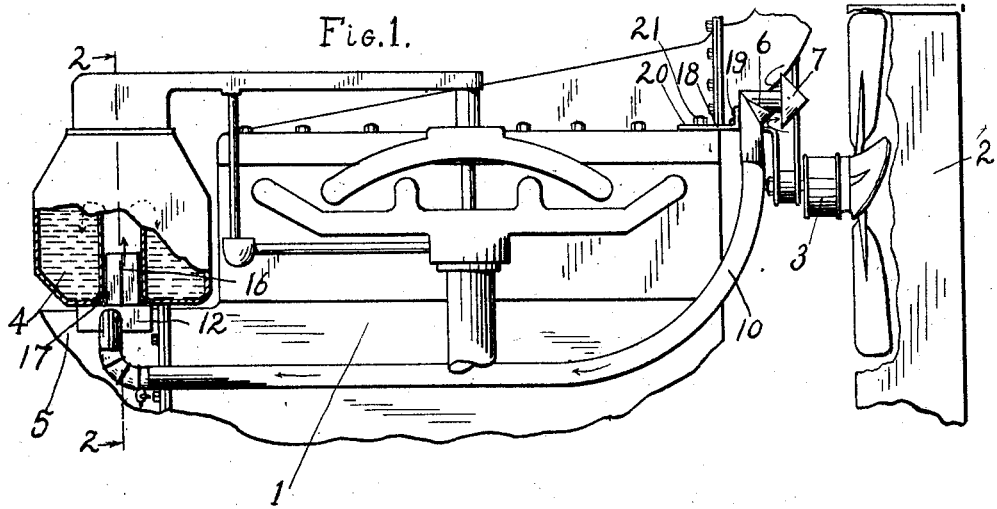
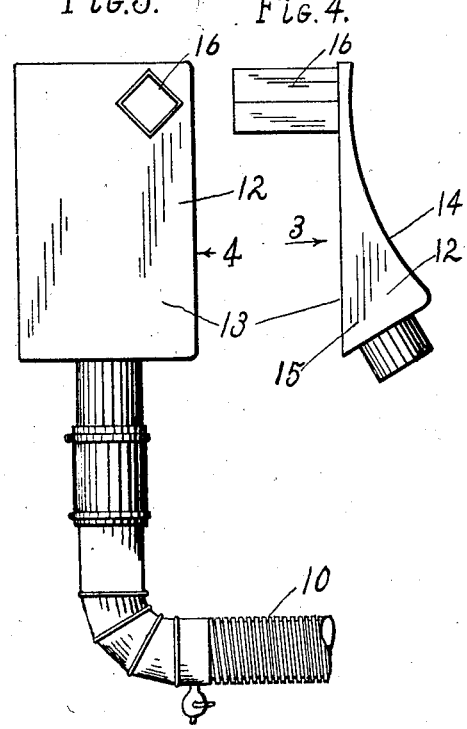
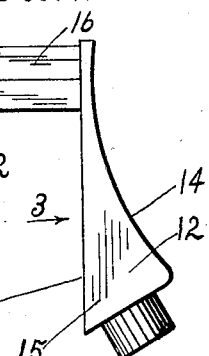
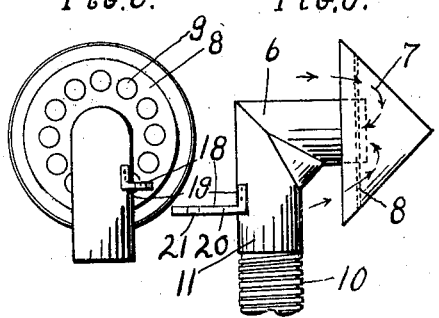
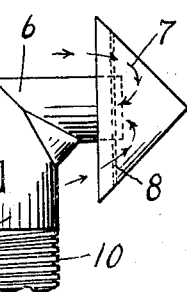
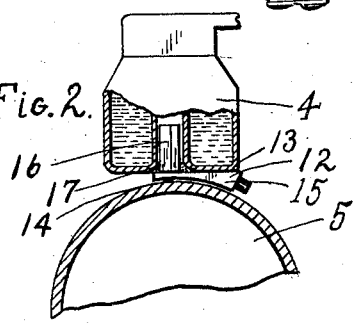
INVENTOR
Shirley J. Morrison.
by Hazard and Miller
Att'ys.

Patented Jan. 25, 1927.

1,615,337

UNITED STATES PATENT OFFICE.

SHIRLEY J. MORRISON, OF SAN FERNANDO, CALIFORNIA.

AIR-WASHER ATTACHMENT.

Application filed September 18, 1925. Serial No. 57,257.

My invention comprises a so-called air washer attachment for automobiles to aid in the separation of sand and dust from the air before it is introduced into a carburetor.

My invention is shown in particular as an attachment to the air washer of the type installed on the tractor known in the trade as the Fordson and comprises an air inlet cap of conical shape placed immediately behind the fan of the radiator with apertures drawing the air inward from the rear. A flexible conduit leads from the inlet cap to a nozzle which may be plugged in the ordinary air opening of the washer as used on this particular type of air washer on the tractor. The nozzle is secured to a curved air chamber which is adapted to rest on the transmission casing of the engine and when the air washer is inserted over the nozzle it holds the air chamber and the nozzle with the rearward part of the flexible conduit in position. A felt washer can be used in the nozzle to prevent the entrance of dust into the air washer parallel to the nozzle.

My invention will be more readily understood from the following description and drawings, in which;

Figure 1 is a side elevation of an engine with my air washer attachment installed thereon.

Fig. 2 is a vertical cross section on the line 2—2 of Fig. 1 in the direction of the arrows, showing the manner of supporting the air chamber in the end of the flexible conduit and the nozzle plugged in the air washer inlet.

Fig. 3 is a plan of the air chamber and nozzle taken in the direction of the arrow 3 of Fig. 4.

Fig. 4 is a side view of the air chamber and nozzle taken in the direction of the arrow 4 of Fig. 3, omitting the air conduit.

Fig. 5 is an enlarged elevation of the air inlet cap as shown in Fig. 1, omitting the air conduit.

Fig. 6 is a rear view of the air inlet cap taken in the direction of the arrows of Fig. 5.

Referring particularly to Fig. 1, an internal combustion engine is designated generally by the numeral 1, having a radiator 2 and a fan 3 at the forward end, and an air washer 4 at its rearward end, the latter being positioned partly over the transmission casing 5. The type of air washer shown and the connections therefrom to the engine are those that are standard on the tractor known as the Fordson, hence need not be described.

The features of my invention comprise an air inlet 6 in the form of an elbow having a conical cap 7 with a diaphragm 8 at the rear of the cap with apertures 9 therethrough so that the air enters at the back of the cap and follows a path as substantially shown by the dotted arrows of Fig. 5. A flexible conduit 10 of any suitable type is connected to the free elbow end 11 of the air inlet and leads to an air chamber 12. This air chamber is formed with a flat upper surface 13, a curved lower surface 14 and opposite side faces 15 joining the top and bottom and the opposite ends. The air chamber is made in this particular shape so that the upper face 13 may fit flat against the lower surface of the air washer 4 and the curved lower surface 14 may rest on the curved transmission casing as shown in Fig. 2. A nozzle 16 which is shown as of square cross section extends upwardly from the face 13 of the air chamber and is made of such size as to conform to the inlet of the air washer. A felted or other suitable gasket 17 is inserted on the nozzle to prevent entrance of dirt into the air washer.

The manner of installing my air washer attachment is substantially as follows:

A small angular bracket 18 has one flange 19 riveted or otherwise secured to the free elbow end 11 of the air inlet 6, the other arm 20 extends rearwardly and has an aperture 21 therethrough which is engaged by the head of the bolt 21 which is one of the set securing the engine cover plate in position. The flexible tube hangs more or less loosely against the engine and the air chamber 12 is supported on the transmission casing 5 with the curved side 14 resting thereon. The air washer 4 is then inserted in position with the nozzle plugging the inlet of the air washer. Hence the air chamber and the rearward end of the conduit are held in the same position.

My invention may be considerably modified in construction and other details to suit other types of engines and different makes of air washers, or it may be designed to connect direct to the intake of the carburetor. Moreover, the flexible conduit 10 may be positioned to become heated and lead hot air to the carburetor. These various changes may be made without departing from the spirit of my invention.

Having described my invention, what I claim is:

1. An air washer attachment comprising in combination an elbow tube air inlet, a diaphragm and a conical cap attached to one branch of the elbow, the apex of the cap faced forwardly of an engine and the diaphragm having a series of apertures therethrough leading into the back of the cap, means to attach the elbow to the forward end of an engine, a flexible air conduit connected to the free end of the elbow, an air chamber having a lower surface adapted to engage a rearward part of the engine and retain it in position, attached to the rear end of the conduit, and a nozzle extending upwardly from the air chamber adapted to plug the inlet opening of an air washer.

2. An air washer attachment as claimed in claim 1, in which the air chamber is curved on its lower face and adapted to engage the curved surface of an engine transmission casing and the upper surface with the nozzle projecting therefrom is formed substantially flat and adapted to engage the base of an air washer.

In testimony whereof I have signed my name to this specification.

SHIRLEY J. MORRISON.